(12) United States Patent
Stummer (10) Patent No.: US 6,305,851 B1
(45) Date of Patent: Oct. 23, 2001

(54) SYSTEMS AND METHODS FOR DETECTING IMPERFECT CONNECTIONS IN OPTICAL SYSTEMS

(75) Inventor: Alan D. Stummer, Thornhill (CA)

(73) Assignee: Ciena Corporation, Linthicum, MD (US)

( * ) Notice: Subject to any disclaimer, the term of this patent is extended or adjusted under 35 U.S.C. 154(b) by 0 days.

(21) Appl. No.: 09/481,826

(22) Filed: Jan. 12, 2000

(51) Int. Cl.[7] .................................................. G02B 6/36
(52) U.S. Cl. ................................................. 385/88; 385/24
(58) Field of Search .................................. 385/24, 88, 89, 385/90, 91, 147; 359/900

(56) References Cited

U.S. PATENT DOCUMENTS 5,463,710 * 10/1995 Filgas et al. .
6,028,661    2/2000 Minami et al. .
6,205,266 *  3/2001 Palen et al. .

* cited by examiner

Primary Examiner—Hung N. Ngo
(74) Attorney, Agent, or Firm—David L. Soltz; Michael R. Cammarata (57) ABSTRACT

A system prevents damage to at least one component of a laser apparatus that includes a laser that emits a light signal of increasing power during power up and at least one connector that receives the light signal from the laser and reflects at least a portion of the light signal when an imperfect connection exists. The system includes a detector and a monitoring circuit. The detector detects the reflected light signal from the connector. The monitoring circuit receives the reflected light signal, determines an amount of power in the reflected light signal, calculates a ratio of the power of the light signal emitted by the laser to the power in the reflected light signal, compares the ratio to a predetermined threshold to determine whether the imperfect connection exists, and shuts down the laser when the imperfect connection exists.

32 Claims, 6 Drawing Sheets

SYSTEMS AND METHODS FOR DETECTING IMPERFECT CONNECTIONS IN OPTICAL SYSTEMS

BACKGROUND OF THE INVENTION

A. Field of the Invention

The present invention relates generally to optical fiber systems and, more particularly, to systems and methods that detect an imperfect connection of fibers of an optical pump.

B. Description of Related Art

Optical communication systems have replaced other communication mediums due to their many advantages. For example, optical communication systems typically have wide bandwidth and low attenuation, are immune to electrical noise, offer relatively secure transmission of signals, and can transmit signals over long distances.

Despite the low attenuation of optical communication systems, the optical signals they transmit nevertheless require amplification. Although many types of optical amplifiers currently exist, the most widely used amplifier includes an optical fiber doped with an optically active material, such as erbium or other rare earth elements. Generally, the core region of the optical fiber contains the dopant, which is optically excited to provide optical gain to an optical signal having a suitable wavelength. The dopant may be excited by subjecting it to an optical pump signal of a suitable pump wavelength. For example, an erbium-doped fiber amplifier amplifies optical signals of wavelengths in the range of 1520 nm to 1580 nm when pumped by an optical pump signal of wavelength 980 nm or 1480 nm.

Conventional systems typically use optical pump lasers to generate the pump signal. The lasers generate optical pump signals of high power density in the pump fibers and the connectors. Imperfect connections, caused, for example, by imperfect mating of fibers or by surface contamination on the fiber ends, such as oils, dust, or dirt, can absorb some of the optical pump power and cause a hot spot, which could irreparably damage the connector. Once damaged, the connector must be replaced.

Accordingly, there exists a need for a system which detects an imperfect connection before damage occurs to the connector.

SUMMARY OF THE INVENTION

Systems and methods consistent with the present invention address this need by monitoring back reflection from the pump connector to detect an imperfect connection before damage can occur.

In accordance with the purpose of the invention as embodied and broadly described herein, a system, in one implementation consistent with the present invention, prevents damage to at least one component of a laser apparatus including a laser that emits a light signal of increasing power during power up. At least one connector is also provided that receives the light signal from the laser, and reflects at least a portion of the light signal when an imperfect connection exists. The system includes a detector and a monitoring circuit. The detector detects the reflected light signal from the connector; and the monitoring circuit receives the reflected light signal, determines an amount of power in the reflected light signal, calculates a ratio of the power of the light signal emitted by the laser to the power in the reflected light signal, compares the ratio to a predetermined threshold to determine whether the imperfect connection exists, and shuts down the laser when the imperfect connection exists.

In another implementation consistent with the present invention, a system detects an imperfect connection in a laser component. The system includes a laser, a connector, and a monitoring circuit. The laser emits a light signal; the connector transmits the light signal external to the laser component and reflects at least a portion of the light signal when an imperfect connection exists; and the monitoring circuit detects an amount of the reflected light signal and determines that the imperfect connection exists when the detected amount of the reflected light signal exceeds a predetermined amount.

In yet another implementation consistent with the present invention, an optical amplifier includes an active optical fiber and at least one laser component. The laser component provides power to the active optical fiber. The laser component includes a laser, a connector, and a monitoring circuit. The laser outputs a light signal. The connector transmits the light signal to the active optical fiber and reflects at least a portion of the light signal when an imperfect connection exists. The monitoring circuit determines whether the imperfect connection exists using the reflected light signal.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings identify the same or similar elements. Also, the following detailed description does not limit the invention. Instead, the scope of the invention is defined by the appended claims and equivalents.

Systems and methods consistent with the present invention detect imperfect connection of fibers coupled to pump lasers to prevent damage to laser components due to the imperfect connection. The systems and methods monitor back reflection from the pump connector, as the pump laser gradually powers up, to determine whether an imperfect connection exists before the pump laser reaches an output power level that can damage the laser components.

Exemplary System

Figure 1:
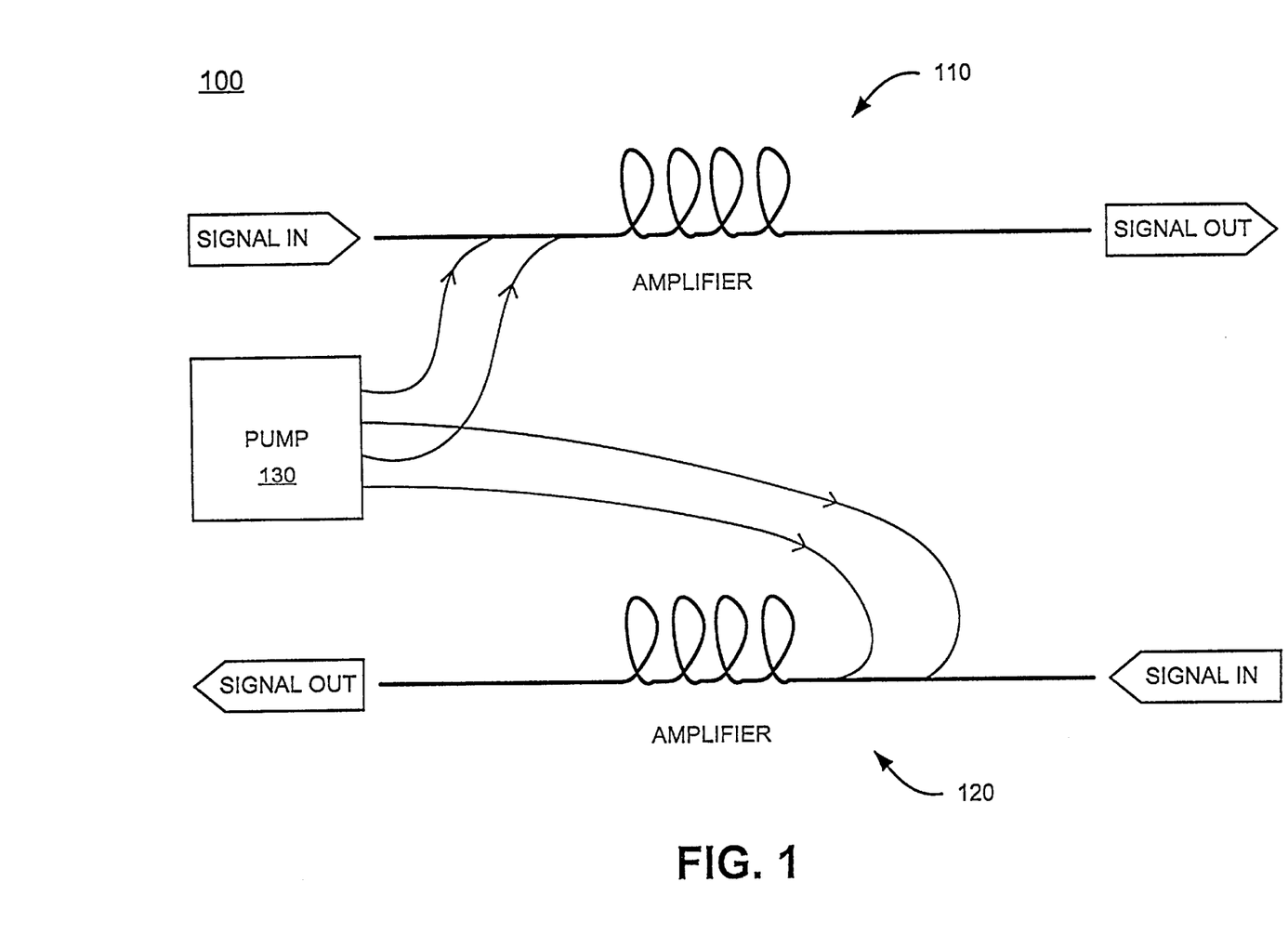
FIG. 1 is a diagram of an exemplary system in which systems and methods consistent with the present invention may be implemented.

FIG. 1 is an exemplary system 100 in which systems and methods consistent with the present invention may be implemented. The system 100 includes two amplifiers 110 and 120 and a pump 130. Each of the amplifiers 110 and 120 may include an active amplifier, such as an Erbium-doped fiber amplifier that amplifies signals travelling along the fiber with a wavelength of approximately 1550 nm. The amplifier 110 amplifies signals travelling in one direction and the amplifier 120 amplifies signals travelling in the opposite direction.

Figure 2:
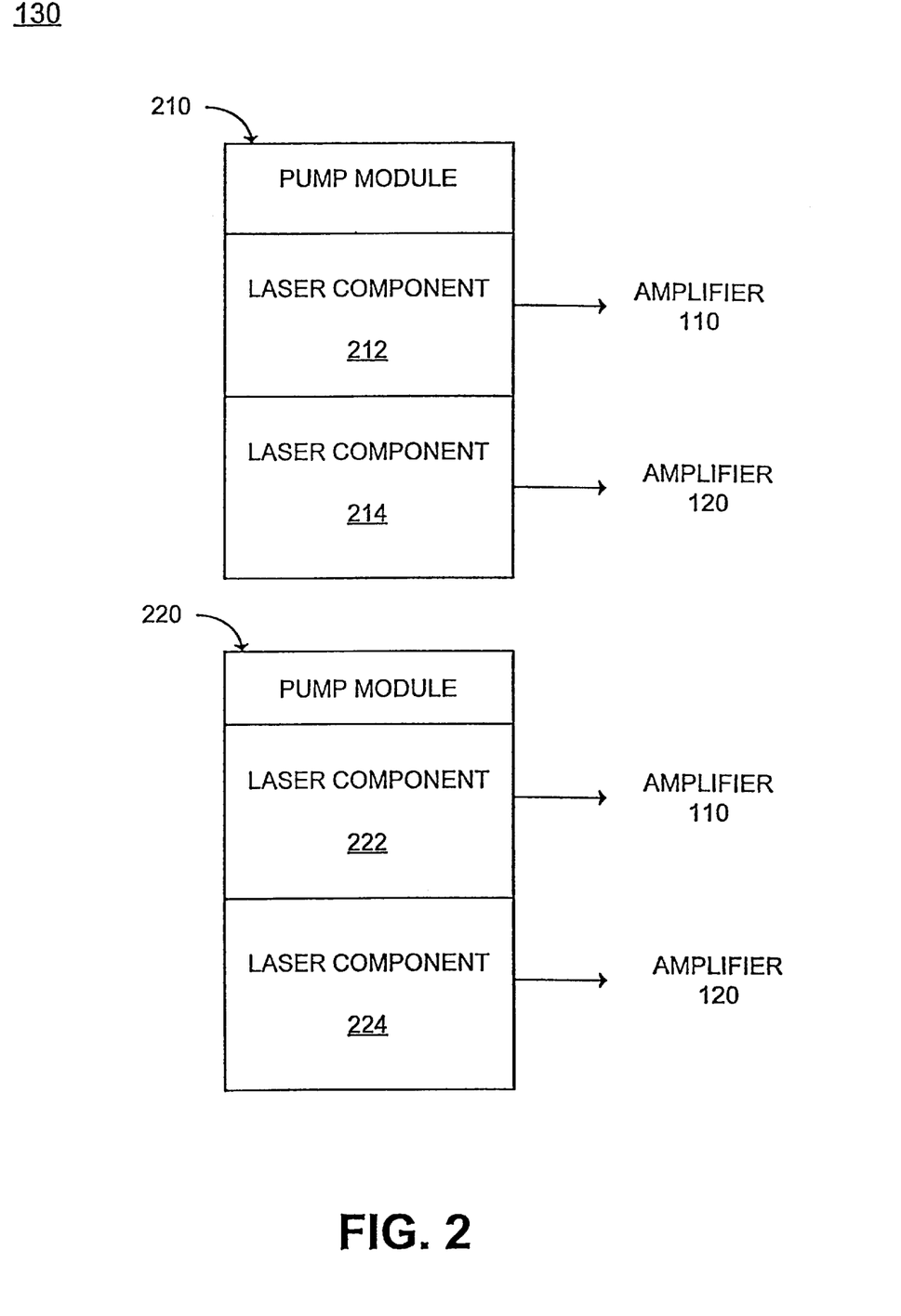
FIG. 2 is a detailed diagram of the pump of FIG. 1 in an implementation consistent with the present invention.

The pump 130 supplies power to the amplifiers 110 and 120. FIG. 2 is a detailed diagram of the pump 130 in an implementation consistent with the present invention. In this implementation, the pump 130 includes two pump modules 210 and 220. Each of the pump modules 210 and 220 typically includes two laser components 212 and 214 and 222 and 224, respectively, for redundancy. In another implementation consistent with the present invention, the pump 130 may include a different number of pump modules and the pump modules may include a different number of laser components.

Figure 3:
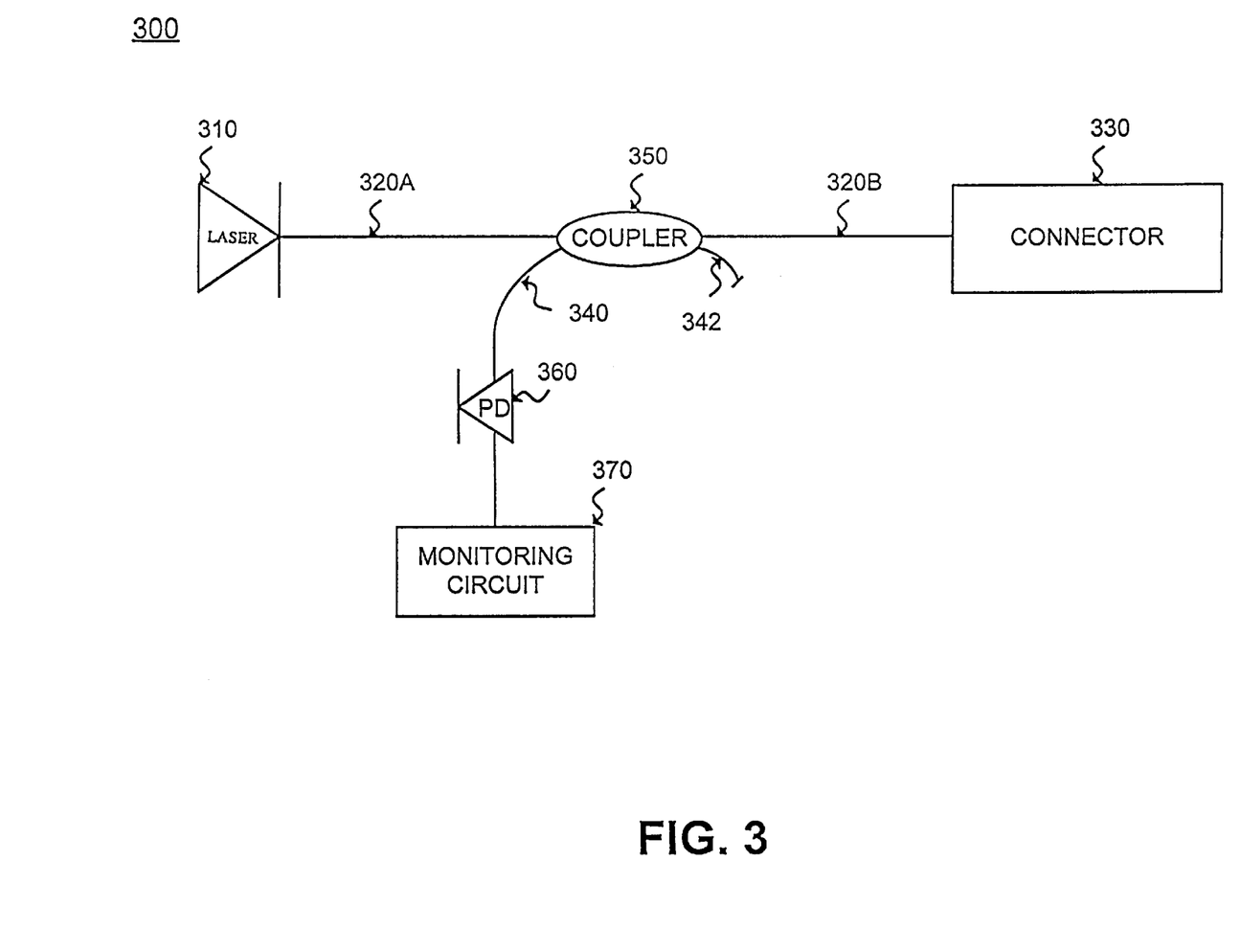
FIG. 3 is a detailed diagram of the laser component of FIG. 2 in an implementation consistent with the present invention.

FIG. 3 is a detailed diagram of a laser component 300, such as laser components 212, 214, 222, and 224, in an implementation consistent with the present invention. The laser component 300, laser 310, a pump fiber 320, a connector 330, a back reflection fiber 340, an optical transfer device, such as a circulator or coupler 350, a detector 360, and a monitoring circuit 370. The laser 310 typically includes a conventional semiconductor laser emitting light in a continuous wave (CW) mode at a wavelength of 980 or 1480 nm. Moreover, the power associated with light output from the laser 310 is typically sufficient to excite the erbium ion in the optical amplifier 110 (FIG. 1), and is often in a range of 100–500 mW. In other implementations consistent with the present invention, the laser 310 emits light of a different power and/or of a different wavelength.

Figure 4A:
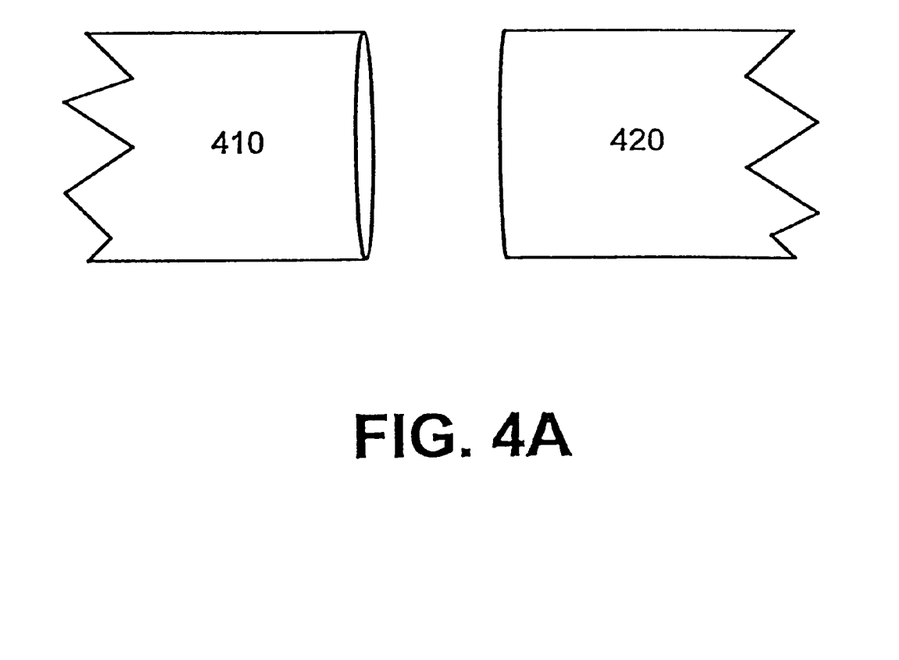
FIGS. 4A and 4B are exemplary diagrams of types of connections that may be provided by the connector of FIG. 3.
Figure 4B:
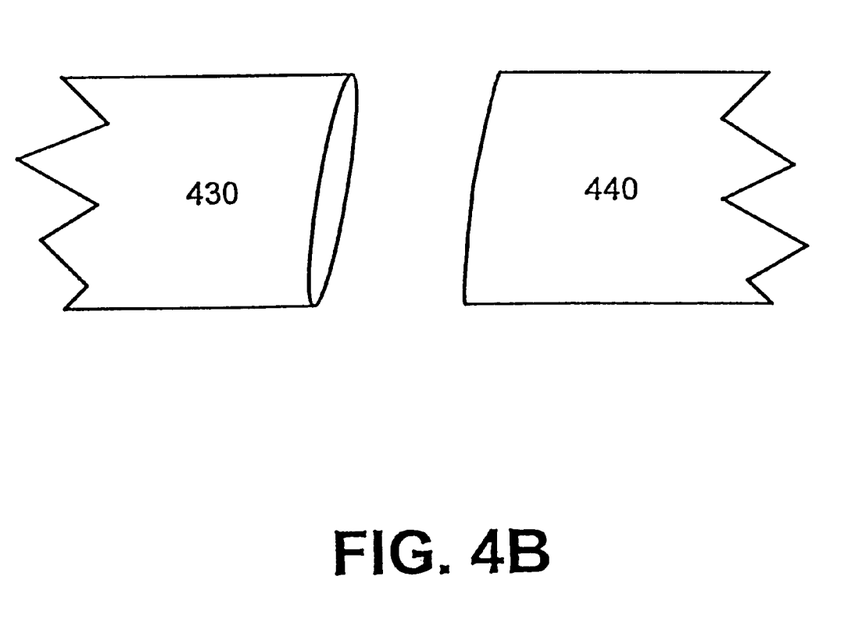

The power fiber 320 (320A and 320B) includes an optical fiber that connects the laser 310 to the connector 330. The connector 330 may include a conventional connector, such as an E2000 style connector manufactured by Diamond. FIGS. 4A and 4B are exemplary diagrams of types of connections that may be provided by the connector 330. FIG. 4A illustrates a straight connection in which the fiber ends 410 and 420 have a straight cut. FIG. 4B illustrates an angled connection in which the fiber ends 430 and 440 have an angled cut, such as a seven degree cut. In general, straight-cut connections cause more reflection of incident light than angled-cut connections.

Returning to FIG. 3, the back reflection fiber 340 includes an optical fiber with one end connected to the coupler 350 and the other end connected to the detector 360 and the monitoring circuit 370. The coupler 350 may include a conventional directional coupler that splits a signal received on the power fiber 320A to both the power fiber 320B and a terminated fiber 342, and splits a reflected signal received on the power fiber 320B to both the power fiber 320A and the reflection fiber 340. The amount of split may vary.

In one implementation consistent with the present invention, the split amount is a 99 percent to 1 percent split (i.e., the coupler 350 has a 1 percent tap). In this case, the coupler 350 transmits 99 percent of the signal received from the pump fiber 320A to the pump fiber 320B and the remaining 1 percent of the signal to the terminated fiber 342, and transmits 99 percent of the reflected signal received from the pump fiber 320B to the pump fiber 320A and the remaining 1 percent of the signal to the reflection fiber 340. In another implementation consistent with the present invention, the split amount is a 100 percent to 0 percent split.

In this case, the coupler 350 transmits 100 percent of the signal received from the pump fiber 320A to the pump fiber 320B, and transmits 100 percent of the reflected signal received from the pump fiber 320B to the reflection fiber 340. One skilled in the art would recognize that other split amounts may also be possible.

When the laser 310 emits a signal, 100 percent of the signal enters the coupler 350 via pump fiber 320A. At this time, no signal enters the coupler 350 via the reflection fiber 340. If the coupler has a 1 percent tap, then the coupler 350 outputs 99 percent of the signal on pump fiber 320B and 1 percent of the signal on terminated fiber 342. Upon reflection at the connector 330 due to surface contamination, for example, 100 percent of the reflected signal enters the coupler 350 on the pump fiber 320B. No signal enters the coupler 350 via the terminated fiber 342 due to a conventional termination at the end thereof. The coupler 350 outputs 99 percent of the reflected signal back to the laser 310 on the pump fiber 320A and 1 percent of the reflected signal to the detector 360 on reflection fiber 340.

The detector 360 may include a photodiode that generates an electrical signal in response to the back-reflected signal on the reflection fiber 340. The electrical signal is then fed to monitoring circuit 370, which may include a conventional transimpedance amplifier. The electrical signal may be in the form of a current, which causes the transimpedance amplifier to output a voltage signal that shuts down the laser 310 when the detected amount of back reflectance is more than a predetermined amount. In other implementations consistent with the present invention, the monitoring circuit 370 includes a computer, microprocessor, or similar circuitry, that shuts down the laser 310 and flags the laser component for maintenance, using, for example, a notification signal, when the amount of back reflectance is more than the predetermined amount.

The monitoring circuit 370 may use a threshold to determine whether an imperfect connection exists at the connector. A clean connection will have minimal back reflection—an amount typically specified by the connector manufacturer. An imperfect connection due, for example, to the presence of surface contamination causes some back reflection beyond the "clean" value. A linear relationship often exists between the amount of power output by the laser 310 and the amount of back-reflected power from an imperfect ("unclean") connection.

The monitoring circuit 370 calculates a ratio of the amount of power output by the laser 310 to the amount of back-reflected power. If the ratio exceeds a predetermined threshold, then the monitoring circuit 370 shuts down the laser 310 and flags the laser component for maintenance. The monitoring circuit 370 detects the presence of the imperfect connection as the laser 310 gradually powers up, allowing the monitoring circuit 370 to detect the imperfect connection before the amount of power output by the laser 310 reaches an amount that can damage the connector.

Exemplary Processing

Figure 5:
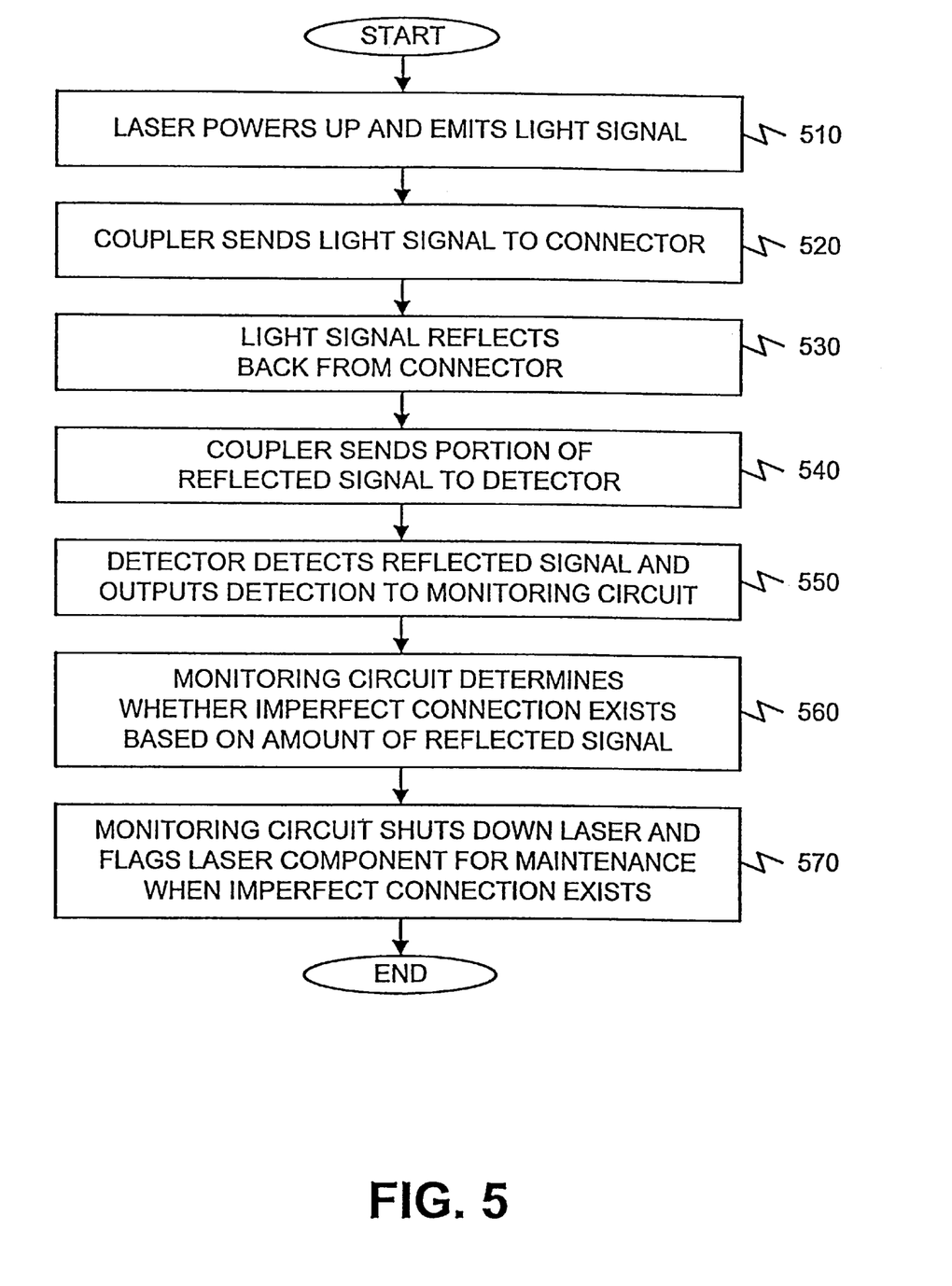
FIG. 5 is a flowchart of exemplary processing for detecting an imperfect connection in a manner consistent with the present invention.

FIG. 5 is a flowchart of exemplary processing for detecting an imperfect connection in a manner consistent with the present invention. Processing begins when the laser 310 (FIG. 3) begins to power up [step 510]. At this time, the laser 310 emits a light signal of low power. Over time, the laser 310 ramps up to emit a light signal of high power, such as 100–500 mW.

As the laser 310 ramps up, it transmits the light signal to the coupler 350 via the pump fiber 320A. Assume that the coupler 350 has a 1 percent tap. The coupler 350 transmits 99 percent of the received signal to the connector 330 over pump fiber 320B and the remaining 1 percent of the signal on the terminated fiber 342 [step 520]. If the connection provided by the connector 330 is imperfect through, for example, an imperfect mating of fibers or surface contamination on the fiber ends, a portion of the signal transmitted on the pump fiber 320B reflects back from the connector 330 [step 530]. The amount of signal reflection depends on the degree of imperfection in the connection.

The pump fiber 320B transmits the reflected signal to the coupler 350. Because the coupler 350 has a 1 percent tap, it transmits 99 percent of the reflected signal back to the laser 310 via the pump fiber 320A. The reflected signal has no effect on the laser 310. The coupler 350 transmits the remaining 1 percent of the reflected signal to the detector 360 via the reflection fiber 340 [step 540]. The detector 360 detects the reflected signal and outputs a signal indicative of the detection to the monitoring circuit 370 [step 550].

Using the signal from the detector 360, the monitoring circuit 370 determines whether an imperfect connection exists [step 560]. To make this determination, the monitoring circuit 370 tracks the power output of the laser 310 as it ramps up. The monitoring circuit 370 determines the ratio of the amount of power output from laser 310 to the amount of power in the reflected signal. If the ratio exceeds a predetermined threshold, the monitoring circuit 370 shuts down the laser 310 and may flag the laser component for maintenance [step 570]. In one implementation consistent with the present invention, the monitoring circuit 370 uses a table or equation relating laser 310 output power to threshold amount for its comparison.

Figure 6:
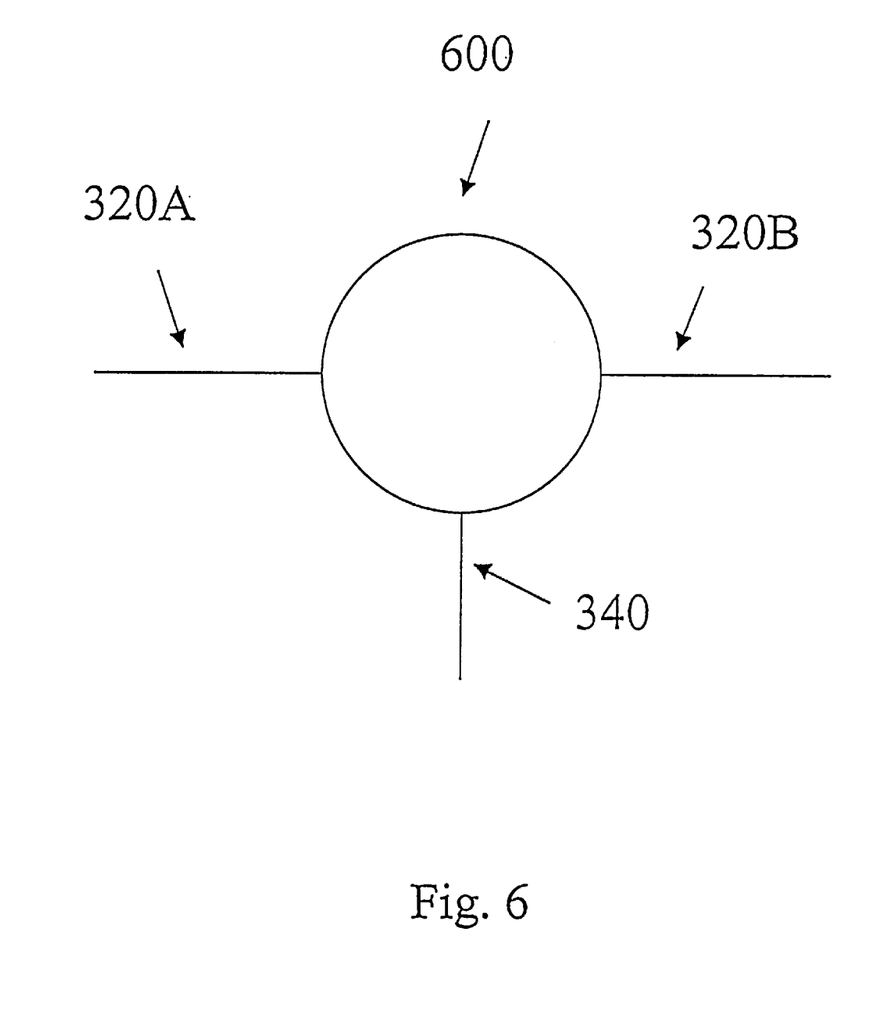
FIG. 6 illustrates a circulator for incorporation into an alternative embodiment of the present invention.

As seen in FIG. 6, a three-port circulator 600 can be used in place of coupler 350. In which case, light output from laser 310 is supplied to a first port of circulator 600 by fiber 320A, and circulated to a second output port coupled to fiber 320B for output to connector 330. Any light reflected from connector 320 reenters the second port, and is circulated to a third output port of circulator 600 to fiber 340 for output to photodetector 360.

Conclusion

Systems and methods consistent with the present invention detect imperfect connections in laser components, as the laser powers up, to prevent damage caused by the imperfect connections to the laser components.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. The scope of the invention is defined by the claims and their equivalents.

What is claimed is:

1. A system for detecting an imperfect connection in a laser component, comprising:
    a laser configured to emit a light signal;
    at least one connector connected to the laser and configured to transmit the light signal external to the laser component and reflect at least a portion of the light signal when an imperfect connection exists; and
    a monitoring circuit configured to detect an amount of the reflected light signal and determine that the imperfect connection exists when the detected amount of the reflected light signal exceeds a predetermined amount.

2. The system of claim 1, further comprising:
    a detector connected to the connector and the monitoring circuit and configured to detect the reflected light signal and output a signal indicative of the detection to the monitoring circuit.

3. The system of claim 2, wherein the detector includes a photodiode.

4. The system of claim 1, further comprising:
    a coupler configured to transmit a first portion of the reflected light signal to the laser and a second portion of the reflected light signal to the monitoring circuit.

5. The system of claim 4, wherein the monitoring circuit is further configured to determine whether the imperfect connection exists from the second portion of the reflected light signal.

6. The system of claim 1, wherein the laser is further configured to emit a light signal of increasing power during power up.

7. The system of claim 6, wherein the monitoring circuit is further configured to determine an amount of power in the reflected light signal.

8. The system of claim 7, wherein the monitoring circuit is further configured to determine a ratio of the power of the light signal emitted by the laser to the power of the reflected light signal, and compare the ratio to a predetermined threshold to determine whether the imperfect connection exists.

9. The system of claim 1, wherein the monitoring circuit is further configured to shut down the laser when the imperfect connection exists.

10. The system of claim 1, wherein the monitoring circuit is further configured to flag the laser component for maintenance when the imperfect connection exists.

11. A system for detecting an imperfect connection in a laser component, comprising:
    means for emitting a light signal;
    means for transmitting the light signal external to the laser component and for reflecting at least a portion of the light signal when an imperfect connection exists;
    means for detecting an amount of the reflected light signal;
    means for determining that the imperfect connection exists when the detected amount of the reflected light signal exceeds a predetermined amount; and
    means for determining whether the imperfect connection exists using the reflected light signal.

12. A method for detecting an imperfect connection in a laser system including a laser, a connector, and a monitoring circuit, the method comprising:
    emitting a light signal by the laser;
    transmitting, by the connector, the light signal external to the laser component and reflecting at least a portion of the light signal when an imperfect connection exists;
    detecting, by the monitoring circuit, an amount of the reflected light signal; and
    determining, by the monitoring circuit, that the imperfect connection exists when the detected amount of the reflected light signal exceeds a predetermined amount.

13. The method of claim 12, wherein the laser system further includes a coupler; and the method further comprising:
    receiving, by the coupler, the reflected light signal from the connector; and
    transmitting a first portion of the reflected light signal to the laser and a second portion of the reflected light signal to the monitoring circuit.

14. The method of claim 13, wherein the determining includes:

determining whether the imperfect connection exists from the second portion of the reflected light signal.

15. The method of claim 12, wherein the emitting includes:

outputting a light signal of increasing power during power up of the laser.

16. The method of claim 15, wherein the detecting includes:

detecting an amount of power in the reflected light signal.

17. The method of claim 16, wherein the determining further includes:

determining a ratio of the power of the light signal output by the laser to the power of the reflected light signal, and comparing the ratio to a predetermined threshold to determine whether the imperfect connection exists.

18. The method of claim 12, further comprising:

turning off the laser when the imperfect connection exists.

19. The method of claim 12, further comprising:

flagging the laser system for maintenance when the imperfect connection exists.

20. A system that prevents damage to at least one component of a laser apparatus that includes a laser that emits a light signal of increasing power during power up and at least one connector that receives the light signal from the laser and reflects at least a portion of the light signal when an imperfect connection exists, the system comprising:

a detector configured to detect the reflected light signal from the connector; and a monitoring circuit connected to the detector and configured to receive the reflected light signal, determine an amount of power in the reflected light signal, calculate a ratio of the power of the light signal emitted by the laser to the power in the reflected light signal, compare the ratio to a predetermined threshold to determine whether the imperfect connection exists, and shut down the laser when the imperfect connection exists.

21. The system of claim 20, further comprising:

a coupler configured to receive the reflected light signal from the connector and transmit a first portion of the reflected light signal to the laser and a second portion of the reflected light signal to the monitoring circuit.

22. The system of claim 21, wherein the monitoring circuit is further configured to use the second portion of the reflected light signal in determining whether the imperfect connection exists.

23. The system of claim 20, wherein the monitoring circuit is further configured to flag the laser components for maintenance when the imperfect connection exists.

24. A method that prevents damage to at least one component of a laser apparatus that includes a laser that outputs a light signal of increasing power during power up and a connector that receives the light signal from the laser and reflects at least a portion of the light signal when an imperfect connection exists, the method comprising:

detecting the reflected light signal from the connector;

determining an amount of power in the reflected light signal;

calculating a ratio of the power of the light signal emitted by the laser to the power in the reflected light signal;

comparing the ratio to a predetermined threshold to determine whether the imperfect connection exists; and terminating the light signal output by the laser when the imperfect connection exists.

25. The method of claim 24, further comprising:

receiving the reflected light signal from the connector and splitting the reflected light signal into first and second portions of the reflected light signal.

26. The method of claim 25, wherein the determining step includes:

detecting an amount of power in the second portion of the reflected light signal.

27. The method of claim 24, further comprising:

notifying that the laser components require maintenance when the imperfect connection exists.

28. An optical amplifier, comprising:

an active optical fiber; and at least one laser component configured to provide power to the active optical fiber, the laser component including:

a laser configured to output a light signal, a connector configured to transmit the light signal to the active optical fiber and reflect at least a portion of the light signal when an imperfect connection exists, and a monitoring circuit configured to determine whether the imperfect connection exists based on the reflected light signal.

29. A system for detecting an imperfect connection in a laser component that includes a laser configured to emit a light signal and a connector connected to the laser and configured to transmit the light signal external to the laser component and reflect at least a portion of the light signal when an imperfect connection exists, the system comprising:

a detector configured to detect the reflected light signal from the connector; and a monitoring circuit connected to the detector and configured to detect an amount of the reflected light signal and determine that the imperfect connection exists when the detected amount of the reflected light signal exceeds a predetermined amount.

30. A system for monitoring an optical connector, comprising:

an optical source;

an optical transfer device having a first port coupled to said optical source, a second port coupled to said optical connector, and a third port;

a photodetector coupled to said third port and being configured to detect light originating from said optical source, passing through said first and second ports to said optical connector, reflected from said optical connector back to said second port, and directed through said third port to said photodetector; and a monitoring circuit coupled to said photodetector, and sensing a signal generated by said photodetector.

31. A system in accordance with claim 30, wherein said optical transfer device includes an optical coupler.

32. A system in accordance with claim 30, wherein said monitoring circuit is configured to deactivate said optical source in response to a predetermined power level of said light.

* * * * *